3,707,467
ELECTROLYTIC CELL
Henry Thomas Joseph Chilton, Llangollen, and Gwilym Ivor Lumley, Wrexham, Wales, assignors to Monsanto Chemicals Limited, London, England
Filed Aug. 13, 1969, Ser. No. 849,673
Claims priority, application Great Britain, Aug. 16, 1968, 39,248/68
Int. Cl. B01k 3/00; C22d 1/04
U.S. Cl. 204—250      6 Claims

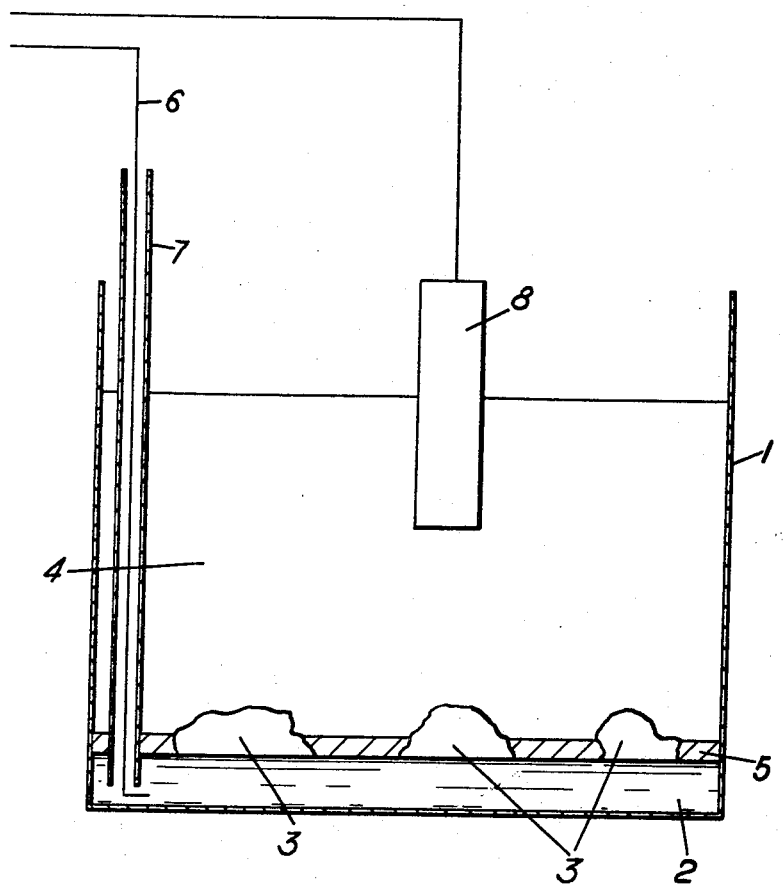

ABSTRACT OF THE DISCLOSURE

An electrolytic cell for use in a process where an electrode material is consumed has at least one piece of the consumable electrode material in electrical contact with a liquid metal and in electrolytic contact with an electrolyte, an insulating liquid layer between the liquid metal and the electrolyte, a second electrode in electrolytic contact with the electrolyte, and electrical connections to the liquid metal and to the second electrode.

---

This invention relates to an electrolytic cell, more particularly to an electrolytic cell for use in a process where an electrode material is consumed.

The continuous operation of such a process requires that the electrode material that is consumed should be periodically replaced, and this is not easy in a conventional electrolytic cell having direct electrical contacts from the external circuit to the electrodes. Moreover the consumable electrode material may be such that it is difficult to make a good electrical contact between the material and, for example, a copper wire.

These disadvantages are overcome in the electrolytic cell according to the invention, which is one having at least one piece of the consumable electrode material in electrical contact with a liquid metal and in electrolytic contact with an electrolyte, an insulating liquid layer between the liquid metal and the electrolyte, a second electrode in electrolytic contact with the electrolyte, and electrical connections to the liquid metal and to the second electrode.

The disadvantages of the conventional cell are overcome since the electrode material consumed can be replaced simply by dropping pieces of consumable material into the cell, and good electrical contact between the external circuit and the consumable electrode material is achieved through the intermediary of the liquid metal.

The cell can be used for the production of alcoholic silica sols by the process described in our British patent specification No. 1,136,016 or, for example, for the production of lead tetra-alkyls using lead as the consumable anode material and a solution of an alkyl magnesium halide in an anhydrous solvent as the electrolyte.

The liquid metal employed is usually mercury, but various alloys, for example Wood's alloy, having relatively low melting points below the temperature at which the electrolysis is conducted can be used.

In the usual arrangement, the liquid metal forms a pool on the base of the cell, and the consumable electrode material will either float on the liquid metal or form islands in the pool depending on the relative densities. The liquid medium of the electrolyte can for example be aqueous, aqueous/organic or largely organic, for example alcoholic, and the current carriers may be anions and cations derived from an acid, a salt or a base.

Where the liquid metal forms a pool on the base of the cell, the insulating liquid should have a density greater than that of the electrolyte but less than that of the liquid metal and that of the consumable electrode material so that it forms an intermediate layer between the liquid metal and the electrolyte. The intermediate layer of insulating liquid is of course discontinuous because of the presence of the consumable electrode material, and the depth of the intermediate layer must of course be less than the vertical height of the piece or pieces of consumable electrode material above the surface of the liquid metal to allow contact of the consumable electrode material with the electrolyte. The solubility of the insulating liquid in the electrolyte should be as low as possible. The range of suitable liquids is somewhat narrower where the electrolyte contains a significant proportion of an organic liquid than where the electrolyte is largely aqueous. Various silicone oils, however, can be used with a range of electrolyte media including alcoholic and aqueous media.

A further preferable characteristic of the material of the insulating layer is that it should have a high viscosity, for example a viscosity of at least 25,000 cps., at the operating temperature to prevent its displacement by circulation of the electrolyte. The depth of the insulating layer is also a factor in this connection.

An electrolytic cell in accordance with the invention is shown in the accompanying drawing. The numeral 1 denotes a tank, beaker or other vessel containing a pool of mercury 2. Pieces of consumable anode material 3 float on the mercury and are in contact with an electrolyte 4 which is elsewhere separated from the mercury by a layer of insulating oil 5. Connection between the mercury and the external circuit is provided by a wire 6 carried in a tube 7 having its open lower end beneath the surface of the mercury. The cathode 8 can be for example a graphite rod suspended in the electrolyte and connected to the external circuit in conventional manner.

A cell of the above type fitted with a cover and a reflux condenser was used to produce a silica in ethanol sol as follows. Mercury to a depth of approximately 1.5 cm. was first introduced into the cell, followed by several pieces of 99% ferrosilicon each having a vertical dimension of at least 1.5 cm. The ferrosilicon floated on the mercury. The surface of the mercury remaining exposed was then covered by a layer of a silicone oil of viscosity 100,000 centipoise to a depth of approximately 1 cm. The electrolyte, which was next introduced into the cell, was a solution of 8 ml. of 98% by weight sulphuric acid in 500 ml. of absolute ethanol. A graphite rod was suspended in the electrolyte and connections were made to the external circuit so that the graphite rod was the cathode and the ferrosilicon the anode of the cell.

Using a direct current of 2 amps the electrolyte was rapidly heated to reflux. Passage of the current was continued for 3 hours during which further pieces of ferrosilicon were added through a suitable vapour-lock device in the cover. There was some dispersion of the silicone oil in the electrolyte during the electrolysis, and at the end of the electrolysis the electrolyte and oil were removed from the cell and subjected to centrifugation. A clear ethanolic sol was thus separated from the oil. The former weighed 325 grams and contained 0.92% by weight of silica.

What is claimed is:
1. An electrolytic cell comprising a vessel containing a bottom layer of liquid metal, a conductor in electrical contact with said liquid metal for connecting said liquid metal with an electric energy source, an intermediate layer of an insulating liquid in contact with said liquid metal, said liquid having a density less than that of said liquid metal, a consumable first electrode in contact with said insulating liquid and with said liquid metal, the vertical height of said consumable electrode being above the surface of said insulating liquid and the density of said electrode being greater than that of the insulating liquid, a layer of liquid electrolyte overlying and in contact with said consumable electrode, and with said insulating liquid said electrolyte having a density below that of said insulating liquid, an electrode in contact with said electrolyte and said vessel having internal wall surfaces formed of an insulating material to thereby sufficiently prevent electrical contact between said electrolyte and said liquid metal through the vessel walls and an electrical conductor in contact with said second electrode for connecting said second electrode to an electric energy source.

2. An electrolytic cell according to claim 1 wherein the liquid metal is mercury.

3. An electrolytic cell according to claim 2 in which the insulating liquid is a silicon oil.

4. An electrolytic cell according to claim 3 in which the insulating liquid has a viscosity of at least 25,000 centipoises at the operating temperature of the cell.

5. An electrolytic cell according to claim 3 wherein the first consumable electrode floats in the liquid metal.

6. An electrolytic cell according to claim 3 wherein there is a plurality of consumable first electrodes.

References Cited

UNITED STATES PATENTS

| | | | |
|---|---|---|---|
| 3,205,155 | 9/1965 | Van Natter | 204—250 X |
| 3,388,047 | 6/1968 | Higgins | 204—224 X |
| 2,873,237 | 2/1959 | Lamberton et al. | 204—219 X |
| 1,227,706 | 5/1917 | Vaygouny | 204—250 X |
| 1,863,254 | 6/1932 | Polin | 204—250 X |
| 3,109,794 | 11/1963 | Gordon | 204—250 X |
| 3,208,920 | 9/1965 | Crew | 204—250 X |

JOHN H. MACK, Primary Examiner

D. R. VALENTINE, Assistant Examiner

U.S. Cl. X.R.

204—59